United States Patent
Blomberg et al.

[19]

[11] Patent Number: 5,964,553
[45] Date of Patent: Oct. 12, 1999

[54] DRILLING TOOL WITH INTERNAL CAVITIES FOR CHIP REMOVAL

[75] Inventors: Torsten Blomberg, Sandviken; Lars Sandberg, Uppsala, both of Sweden

[73] Assignee: Sandvik AB, Sandviken, Sweden

[21] Appl. No.: 08/750,617

[22] PCT Filed: May 31, 1995

[86] PCT No.: PCT/SE95/00616

§ 371 Date: Feb. 24, 1997

§ 102(e) Date: Feb. 24, 1997

[87] PCT Pub. No.: WO95/34398

PCT Pub. Date: Dec. 21, 1995

[30] Foreign Application Priority Data

Jun. 13, 1994 [SE] Sweden ................................. 9402037

[51] Int. Cl.$^6$ ................................................. B23B 51/00
[52] U.S. Cl. ........................... 408/224; 408/57; 408/223; 408/227
[58] Field of Search ............................. 408/57, 207, 223, 408/224, 227

[56] References Cited

U.S. PATENT DOCUMENTS

| 4,108,567 | 8/1978 | Faber . | |
|---|---|---|---|
| 4,215,957 | 8/1980 | Holma et al. . | |
| 4,285,618 | 8/1981 | Shanley, Jr. | 408/223 |
| 4,768,901 | 9/1988 | Reinauer et al. . | |
| 5,302,059 | 4/1994 | Fabiano . | |
| 5,302,060 | 4/1994 | Nystrom et al. . | |
| 5,697,737 | 12/1997 | Danielsson et al. | 408/83 |

FOREIGN PATENT DOCUMENTS

| 2 316 762 | 10/1974 | Germany . |
|---|---|---|
| 347 450 | 8/1972 | Sweden . |
| 468 930 | 4/1993 | Sweden . |
| 94/15740 | 7/1994 | WIPO . |

Primary Examiner—Andrea L. Pitts
Assistant Examiner—Monica Smith
Attorney, Agent, or Firm—Burns, Doane, Swecker & Mathis, L.L.P.

[57] ABSTRACT

A drilling tool includes a one-piece drill body having axially spaced front and rear ends. The front end includes pockets for receiving cutting inserts spaced by respective radial distances from a center axis of rotation of the drill body. Chip canals are formed in the front end, and a frustoconical chip space is formed in the drill body for connecting the chip canals to an axial passage which discharges chips through the rear end of the drill body.

8 Claims, 3 Drawing Sheets

5,964,553

DRILLING TOOL WITH INTERNAL CAVITIES FOR CHIP REMOVAL

RELATED INVENTION

This is a continuation of International Application No. PCT/SE95/00616, filed May 31, 1995, which designated the United States. The invention is related to that disclosed in concurrently filed U.S. application Ser. No. 08/750,621 (WO 95/34397).

BACKGROUND OF THE INVENTION

The present invention relates to a drilling tool for the chip-breaking machining of metallic materials, especially for so-called ejector drilling. However, it may also advantageously be used for so-called BTA-drilling.

It is known to use cutting inserts of cemented carbide for drills, which inserts are fastened by mechanical fastening arrangements, the inserts being provided with one or more recesses in the chip surface for chip-breaking purposes. Such drills are, for instance, known from U.S. Pat. No. 4,215,957. However, it has turned out to be difficult to attain an optimal forming of the chips. That is, it has been impossible to attain the desired short, comma-shaped chips, at the same time as it has been impossible to reduce power consumption when running the drill in the desired way. Further, sometimes the chip canals, which conduct the chips to a central discharge hole, have turned out to be too narrow for the created chips, which has resulted in a chip stoppage and jamming.

Further, in U.S. Pat. No. 5,302,060 drilling tool is described comprising a drill body on which two or more cutting inserts are mounted. The inserts are substantially formed as trapezoids and are axially mounted, i.e., the abutment surfaces of the cutting inserts extend axially, the inserts suitably being fixed by brazing. However, after a certain time of wear, also this drill body has sometimes caused chip jamming in the area where the two chip canals and the central hole meet. Moreover, the drill body consists of two parts which are joined by welding, namely the drill head or crown, and the cylindrical, threaded shaft part. This weld joint in combination with the fact that the drill crown has been cast, has frequently resulted in an imperfect roundness of the final product. This has in turn caused customers to require that a finishing grinding be performed in order to attain a perfect roundness and rotation symmetry around is the central axis, which unnecessarily increases the production cost of the drill. A further drawback of this weld joint has turned out to be that chips occasionally get stuck in the weld joint, since in practice a weld joint leaves a certain gap on the interior side. Sometimes, even if only a single chip gets wedged in that gap, the following chips can pile up and cause chip jamming and, in a worst case, a tool breakdown.

Thus, a primary object of the present invention is to provide a drill body, particularly a drill body for ejector drilling, that practically eliminates any risk of chip jamming.

A further object of the present invention is to eliminate any unevenness on the inside of the drill body, in which a chip could get jammed.

Another object of the present invention is to provide a drill body with practically perfect external roundness.

SUMMARY OF THE INVENTION

The present invention relates to a drilling tool comprising a drill body of a generally cylindrical shape defining a central axis of rotation. The drill body has axially spaced front and rear end surfaces, and a passage extending axially into the body from the rear end surface. A plurality of insert pockets is formed in the front end surface, the pockets adapted to receive respective cutting inserts. The body is of one piece from the rear end surface to the front end surface. At least one chip canal is formed in the front end surface. A chip space is formed in the drill body rearwardly of the front end surface for interconnecting the at least one chip canal with the passage. The chip space is of generally frustoconical shape, with a wide end thereof being connected to the at least one canal, and a narrow end thereof being connected to the passage.

BRIEF DESCRIPTION OF THE INVENTION

For illustrative but non-limiting purposes, a preferred embodiment of the invention will now be further described with reference to the appended drawings wherein.

DETAILED DESCRIPTION OF THE PREFERRED EMBODIMENT

Figure 1:
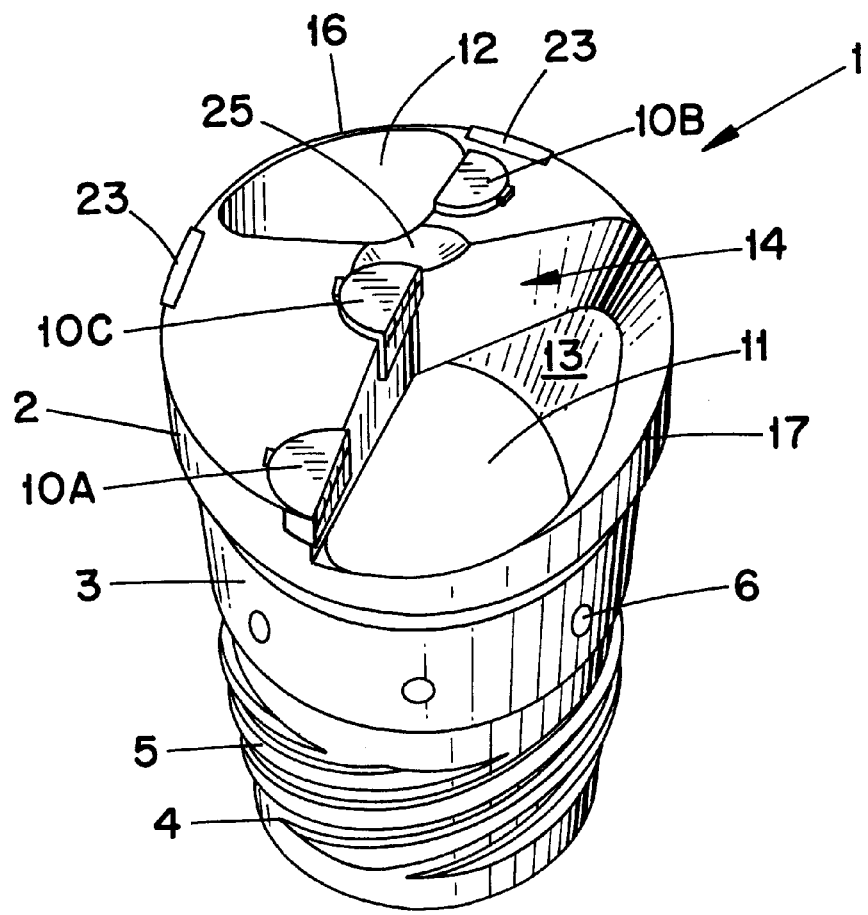
FIG. 1 shows a drilling tool according to the invention in a perspective view obliquely from above.

In FIG. 1, a drilling tool of the ejector type is generally designated by reference numeral 1. Advantageously, the tool may also be generally used for so-called BTA-drilling. The tool comprises a front drilling crown or head 2, an intermediate part 3 and a shaft 4. The shaft 4 is provided with an outer screw thread 5, which is intended, in a way known per se, to be threaded into an outer tube (not shown). An inner tube (not shown) that is concentrical with the outer tube would be inserted in a way known per se into an inner, substantially cylindrical cavity or passage 15 of the drill, extending past a plurality of cooling medium holes 6, whereby formed chips entrained in the cutting medium travel through the inner tube via chip canals 11 and 12.

According to a previously known technique (for instance, disclosed in U.S. Pat. No. 4,768,901), the drill head 2 per se is formed by casting, while the shaft 4 is formed by turning, whereafter these two parts are joined by welding. A welding always causes deformations due to heat expansion and an uneven contraction during the following cooling. These inconveniences are further accentuated in thin parts. Further, the head may become somewhat unround, in spite of the precision casting. These inconveniences are fully overcome by the present invention by producing the whole drill body in one single piece by turning, thereby avoiding all welding, which in turn brings the advantage that any risk of weld joint gaps being formed on the inside of the drill are avoided, which gaps could snag chips and produce a chip jam.

Figure 3:
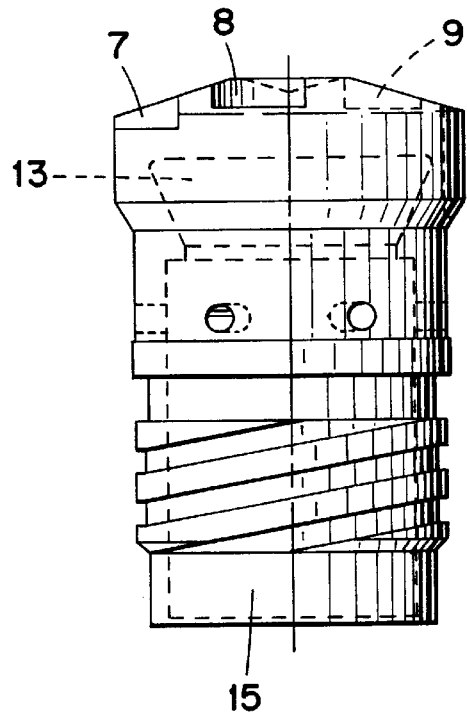
FIG. 3 shows the same drilling tool as in FIG. 1 in a side view without the inserts.
Figure 4:
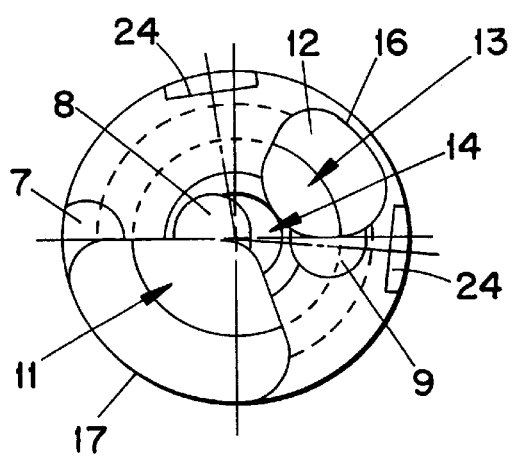
FIG. 4 shows the drilling tool straight from above.
Figure 5:
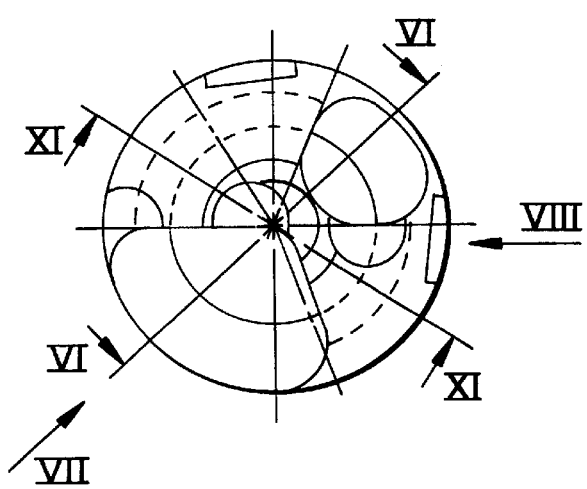
FIG. 5 shows the same view as FIG. 4, and further including section lines defining the views of FIGS. 5 to 8.

As may be seen in FIGS. 3 and 4, the top side of the drill head is provided with three cutting insert seats or pockets 7, 8 and 9 each intended to accommodate a drill cutting insert. Advantageously, the three cutting inserts 10A, 10B, 10C are identical, the only difference being that the central cutting insert 10C is reversed in comparison to the peripheral and intermediate cutting inserts 10A and 10B, respectively. The number of cutting inserts in an ejector drill may be between one and five. However, the disadvantage with only a single cutting insert is that the cutting forces that the support pads have to endure become large since the drill becomes unbalanced.

It has been found that the use of three inserts is a good compromise between complexity, life and out-balancing.

Figure 2:
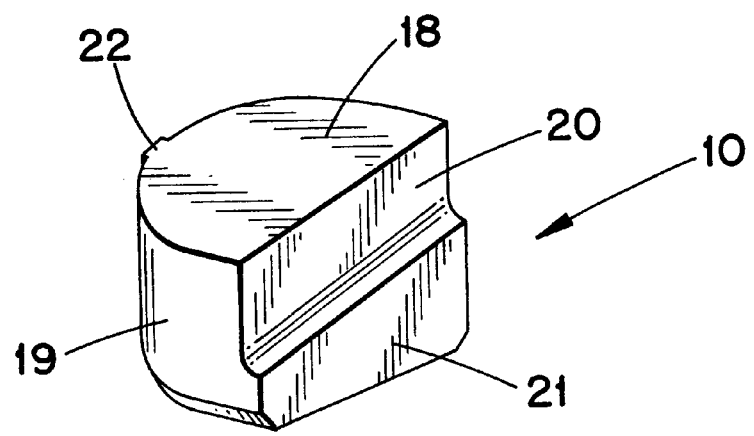
FIG. 2 shows a drill cutting insert according to the invention in a perspective view obliquely from above.

The ejector drill is usually produced as a one-way drill, and the cemented carbide inserts according to FIG. 2 are therefore soldered or brazed in the cutting pockets. Since it is of one-way type, the drill should be worn as long as possible without the product quality and the break-down risk becoming disturbing.

The peripheral insert 10A determines the diameter of the drilled hole, which is usually between 20 and 65 mm. The cutting edge PE of this peripheral insert 10A is linear and inclined upwardly (i.e., axially forwardly) as the cutting edge progresses radially inwardly. The adjacent central cutting insert 10C disposed in the cutting pocket 8 is arranged to overlap the center axis of the drill, since no core is desired to remain in the workpiece. Contrary to the peripheral insert 10A, the cutting edge CE of the central insert 10C is inclined downwardly (i.e., axially rearwardly) as the cutting edge progresses radially inwardly, since otherwise the trailing cutting insert 10B would be submitted to such a large stress that it would very soon break. In agreement with the above-described inclination of the central cutting edge CE, the tip of head 2 is provided with a conical recess 25. On the opposed side of the central axis A, the intermediate cutting insert 10B is disposed in the insert pocket 9. Like the peripheral insert 10A, the cutting edge IE of the intermediate insert is inclined upwardly (i.e., axially forwardly) as the cutting edge progresses radially inwardly.

During rotation of the tool, the revolution path of the cutting edge IE of the intermediate insert overlaps somewhat with both the cutting edges of the peripheral and the central cutting inserts, in order to obtain a continuous cutting line from the central axis to the periphery. According to the present invention, the inserts may be either tangentially positioned, as illustrated in the appended figures, or axially positioned, as, for instance, disclosed in U.S. Pat. No. 5,302,060. However, they are more preferably arranged in accordance with the appended figures.

Figure 6:
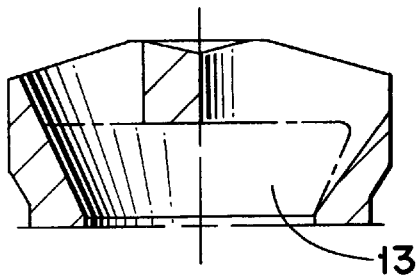
FIG. 6 shows a cross-section taken along line 6—6 in FIG. 5, of only the upper part of the tool.
Figure 7:
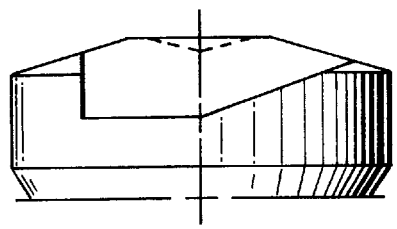
FIG. 7 shows a side view taken in the direction of arrow 7, of only the upper part of the tool.
Figure 8:
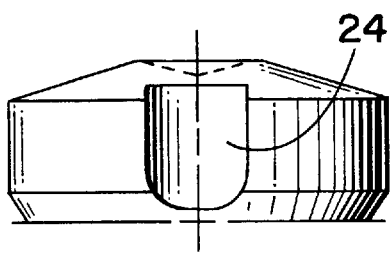
FIG. 8 shows a side view taken in the direction of arrow 8 in FIG. 5, of only the upper part of the tool.
Figure 9:
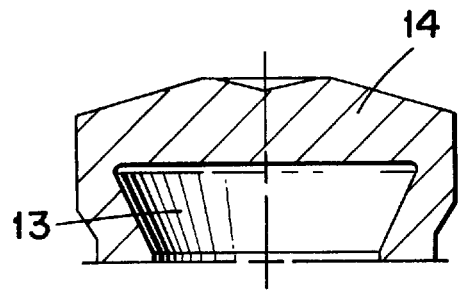
FIG. 9 shows a cross-section taken along line 9—9 in FIG. 5, of only the upper part of the tool.

The two chip canals, ducts or flutes 11 and 12 terminate in the top side of the drill. The larger chip canal 11 services the peripheral and the central inserts, and the somewhat smaller chip canal 12 services the intermediate cutting insert. In conformity with a preferred embodiment of the present invention, the opposed, lower ends of these chip canals are connected to one another by means of an inner chip space 13 located at a distance below the crown 2. Thus, the crown 2 and a ceiling 30 of the chip space 13 form therebetween a bridge 14 which extends over the space 13 and is connected to two diametrically opposite the parts of the top (front) end of the drill. The chip space 13 is of generally frustoconical shape which narrows in a downward (i.e. axially rearward) direction as can be seen in FIG. 9 and in phantom lines in FIG. 6. Due to this chip space 13, the central and intermediate cutting inserts 10C, 10B will be mounted on the bridge 14.

Since the whole drill 1 is preferably made in one single piece, the space 13 is formed by a turning tool introduced through the opening or substantially cylindrical cavity 15 formed in the rear end of the drill. This space 13 results in several advantages, of which may be mentioned increased chip space with minimized risk for chip jamming, and a lighter drill weight. The space 13 would be impossible to form solely by casting. However, thanks to the fact that the whole drill body is cast in one single piece, and then turned, cavities may be formed which increase inwardly. The chip canals 11 and 12 have been milled out from above, i.e., from the drill's top side. In order to optimize the available chip space in the chip flutes, the milling tool has been angled relative to the central axis A of the drill, adjacent to the periphery of the drill, so that outwardly angled, bevelled surfaces 32 have been obtained, which adjoin either the immediate proximity of the outer envelope surface of the drill via a small land portion 16 at the canal 12, or which directly form a break line 17 with that envelope surface at the canal 11.

In view of the above description, the effect of the combination of a one-piece drilling tool together with the turned-out chip space 13 is evident, namely that both cooperate to achieve maximal and fully unhindered chip flow. If, for instance, the chip space 13 were formed as a two-piece welded drill, the weld joint would be located on the conical envelope surface of said space, where a weld joint gap would inherently be formed which eventually would cause a wedging of a chip. On the other hand, if the boring 15 were to continue uniformly without any chip space 13, the available chip flow space would diminish and thereby the risk for chip jamming would increase.

The rotation-symmetrical outer surface of the drill is suitably made by turning while the other external surface portions are formed by milling. As best seen in FIGS. 3 and 4, each of the insert pockets 7, 8 and 9 includes a rear abutment surface 7A, 8A, 9A extending axially. The pockets 7, 8, 9 are made in the simplest possible way, namely by one single short, straight end milling operation per insert seat, with one and the same end mill. Thereby, the rear abutment surface of the insert pocket of course gets a rounded, semi-circular shape corresponding to the cutting diameter of the end mill which forms the pocket. The inner cavity 15 is bored, whereafter, as mentioned above, the chip space 13 is formed by turning at a forward end of the cylindrical cavity 15.

As mentioned, FIG. 2 reproduces a cutting insert 10 according to the present invention. Inter alia, the insert comprises a relief surface 18 and a rounded rear wall 19. The chip surface comprises an extended chip breaker 20 and below that a substantially planar chip surface portion 21. On the rounded rear wall of the cutting insert, there is provided a distance knob 22 which sets aside any interferences when positioning the insert in the insert pocket due to unevenness that may arise when the inserts are pressed. Moreover, the distance knob 22 minimizes the risk for any positioning discrepancies caused by a varying thickness of the solder layer, due to the fact that the contact between the two opposed semi circle-shaped surfaces becomes minimal.

The rounded rear wall of the cutting insert gives a considerably reduced risk for the formation of cracks, since it permits a favorable stress pattern without any sharp corners which involve stress concentrations. Further, since the length of the insert is large in comparison to the insert width, a larger support is obtained for taking up cutting forces. Moreover, the insert behaves very favorably during the pressing per se and does not cause any compacting problems whatsoever.

In order to absorb radial cutting forces, the drill according to the invention is equipped with support pads 23 which are soldered or brazed in support pad pockets 24. Also, these support pad pockets are suitably milled out by a single straight milling operation with an end mill, in the same way as the insert pockets 7, 8 and 9. The support pad may suitably have a matching shape, i.e., an elongated body with parallel long sides 38 and a rounded end surface 40. Furthermore, the outer side of the support pad is suitably given a rounded shape, i.e., the shape of a cylinder surface segment, in order to substantially conform to the substantially cylindrical envelope surface of the drill.

During the mounting of the inserts and the support pads, the rounded rear abutment surface of the respective pockets functions as a guide during the initial stage of the mounting, i.e., it permits a certain displacement laterally, which is a necessity for automated mounting operations.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A drilling tool comprising a drill body of generally cylindrical shaped defining a central axis of rotation; the drill body having axially spaced front and rear end surfaces, an external screw thread disposed between the front and rear end surfaces, and a passage extending axially into the body from the rear end surface; a plurality of insert pockets formed in the front end surface and adapted to receive respective cutting inserts; the body being of one-piece from the rear end surface to the front end surface; at least one chip canal formed in the front end surface; a chip space formed in the drill body rearwardly of the front end surface for interconnecting the at least one chip canal with the passage; the chip space being of generally frustoconical shape with a wide end thereof connected to the at least one canal, and a narrow end thereof connected to the passage; the frustoconical shape extending 360 degrees about the central axis.

2. The drilling tool according to claim 1 wherein the insert pockets are tangentially oriented in the front end surface, each pocket including an axially extending rear abutment surface that is rounded as viewed in a direction parallel to the axis.

3. A drilling tool comprising a drill body of generally cylindrical shaped defining a central axis of rotation; the drill body having axially spaced front and rear end surfaces, and a passage extending axially into the body from the rear end surface; a plurality of insert pockets formed in the front end surface and adapted to receive respective cutting inserts; the body being of one-piece from the rear end surface to the front end surface; at least one chip canal formed in the front end surface; a chip space formed in the drill body rearwardly of the front end surface for interconnecting the at least one chip canal with the passage; the chip space being of generally frustoconical shape with a wide end thereof connected to the at least one canal, and a narrow end thereof connected to the passage, the insert pockets being tangentially oriented in the front end surface, each pocket including an axially extending rear abutment surface that is rounded as viewed in a direction parallel to the axis.

4. The drilling tool according to claim 3 further including cutting inserts affixed in respective ones of the pockets, each cutting insert having a rear wall engaging a respective abutment surface and having a correspondingly rounded shape.

5. The drilling tool according to claim 1 wherein there are three of the pockets; the pockets respectively defining a center pocket, a peripheral pocket and an intermediate pocket; the pockets being spaced by different respective radial distances from the axis.

6. The drilling tool according to claim 5 wherein there are two of the chip canals; one of the chip canals being arranged adjacent to the peripheral pocket and the central pocket, and the other chip canal being arranged adjacent the intermediate pocket.

7. The drilling tool according to claim 1 wherein the drill body includes an outer envelope surface having a plurality of recesses formed therein, each recess including a pair of parallel long sides interconnected by an end side; the end side being of substantially semi-circular shape; and support pads affixed within respective ones of the recesses and each having a shape corresponding to that of its respective recess.

8. The drilling tool according to claim 1 wherein the tool is an ejector drill.

* * * * *